(12) United States Patent
Kovacevic (10) Patent No.: US 7,130,316 B2
(45) Date of Patent: Oct. 31, 2006

(54) SYSTEM FOR FRAME BASED AUDIO SYNCHRONIZATION AND METHOD THEREOF

(75) Inventor: Branko D. Kovacevic, Willowdale (CA)

(73) Assignee: ATI Technologies, Inc., Toronto (CA)

( * ) Notice: Subject to any disclaimer, the term of this patent is extended or adjusted under 35 U.S.C. 154(b) by 848 days.

(21) Appl. No.: 09/833,493

(22) Filed: Apr. 11, 2001

(65) Prior Publication Data

US 2002/0150126 A1 Oct. 17, 2002

(51) Int. Cl.
*H04J 3/06* (2006.01)

(52) U.S. Cl. .................................. 370/509; 348/512

(58) Field of Classification Search ............ 370/503, 370/509, 510; 348/512, 513, 515, 516, 518, 348/521, 552
See application file for complete search history.

(56) References Cited

U.S. PATENT DOCUMENTS

| | | | | |
|---|---|---|---|---|
| 5,703,877 | A * | 12/1997 | Nuber et al. | 370/395.64 |
| 5,905,768 | A * | 5/1999 | Maturi et al. | 375/364 |
| 5,960,006 | A * | 9/1999 | Maturi et al. | 370/509 |
| 6,034,731 | A * | 3/2000 | Hurst, Jr. | 375/240.26 |
| 6,429,902 | B1 * | 8/2002 | Har-Chen et al. | 348/518 |
| 6,785,267 | B1 * | 8/2004 | Knappe | 370/353 |

OTHER PUBLICATIONS

"Transmission of Non-Telephone Signals," Information Technology—Generic Coding of Moving Pictures and Associated Audio Information: Systems, ITU-T Recommendation H.222.0, Jul. 1995, 120 pp.

"Information Technology—Generic Coding of Moving Pictures and Associated Audio Information—Part 3: Audio," ISO/IEC 13818-3, Second Edition, Apr. 15, 1998, 116 pp.

Sondermeyer, Jeff; "Rational Sample Rate Conversion with Blackfin Processors"; Engineer to Engineer Note EE-183; Analog Devices, Jan. 20, 2003; pp. 1-25.

* cited by examiner

*Primary Examiner*—Huy D. Vu
*Assistant Examiner*—Daniel Ryman (57) ABSTRACT

A system and method is provided for synchronizing the presentation of audio data with video data. Audio transport packets are received through a demultiplexer from a multimedia transport stream. A transport stream synchronization manager is used to lock a system time clock, local to the demultiplexer, to a program clock reference provided through the multimedia transport stream. Presentation time stamps are provided with the audio transport packets to indicate when decoded audio data is to be output. A packetized elementary stream synchronization manager maintains synchronization by adding or dropping audio packets from the audio transport packets. If the packetized elementary stream manager is unable to acquire synchronization it must defer synchronization back to the transport stream synchronization manager. Otherwise, processed audio packets are passed to an elementary stream synchronization manager that attempts to synchronize the delivery of audio data through a sample rate conversion of the audio data. If the elementary synchronization manager is unable to acquire synchronization, it defers synchronization to the packetized elementary stream synchronization manager.

56 Claims, 8 Drawing Sheets

FIG. 1

| Value | Description |
|---|---|
| 0x00 | ITU-T | ISO/IEC reserved |
| 0x01 | ISO/IEC 11172-2 Video |
| 0x02 | ITU-T Rec. H.262 | ISO/IEC 13818-2 Video or ISO/IEC 11172-2 constrained parameter video stream |
| 0x03 | ISO/IEC 11172-3 Audio |
| 0x04 | ISO/IEC 13818-3 Audio |
| 0x05 | ITU-T Rec. H.222.0 | ISO/IEC 13818-1 private_sections |
| 0x06 | ITU-T Rec. H.222.0 | ISO/IEC 13818-1 PES packets containing private data |
| 0x07 | ISO/IEC 13522 MHEG |
| 0x08 | Annex A – DSM CC |
| 0x09 | ITU-T Rec. H.222.1 |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | ISO/IEC 13818-1 auxiliary |
| 0x0F - 0x7F | ITU-T Rec. H.222.0 | ISO/IEC 13818-1 reserved |
| 0x80 - 0xFF | User private |

STREAM_TYPE
ASSIGNMENTS

FIG. 2

| stream_id | Stream coding |
|---|---|
| 1011 1100 | program_stream_map |
| 1011 1101 | private_stream_1 |
| 1011 1110 | padding_stream |
| 1011 1111 | private_stream_2 |
| 110x xxxx | ISO/IEC 13818-3 or ISO/IEC 11172-3 audio stream number x xxxx |
| 1110 xxxx | ITU-T Rec. H.262 | ISO/IEC 13818-2 or ISO/IEC 11172-2 video stream number xxxx |
| 1111 0000 | ECM_stream |
| 1111 0001 | EMM_stream |
| 1111 0010 | ITU-T Rec. H.222.0 | ISO/IEC 13818-1 Annex B or ISO/IEC 13818-6_DSMCC_stream |
| 1111 0011 | ISO/IEC_13522_stream |
| 1111 0100 | ITU-T Rec. H.222.1 type A |
| 1111 0101 | ITU-T Rec. H.222.1 type B |
| 1111 0110 | ITU-T Rec. H.222.1 type C |
| 1111 0111 | ITU-T Rec. H.222.1 type D |
| 1111 1000 | ITU-T Rec. H.222.1 type E |
| 1111 1001 | ancillary_stream |
| 1111 1010 ... 1111 1110 | Reserved data stream |
| 1111 1111 | program_stream_directory |

SYSTEM FOR FRAME BASED AUDIO SYNCHRONIZATION AND METHOD THEREOF

FIELD OF THE DISCLOSURE

The present invention relates generally to the synchronization of data and more particularly to synchronizing audio data.

BACKGROUND

Decompression of MPEG-2 data requires synchronization between audio and visual components. The precise time to present uncompressed data is generally indeterminate relative to the time when the data is received in compressed form. However, through presentation time stamps (PTS) it is possible to positively identify specific presentation times for audio, visual or auxiliary data. Program clock reference time stamps that are given a 'stream time' are transmitted in the adaptation field of audio or visual packets or auxiliary data (depending which stream is a master) at least ten times every second. Having a stream time and "stamping" the data associated with packets with a PTS, a system may establish a reference to which time the data should be given to the audio/video/auxiliary decoder. PTS is available at a packetized elementary stream (PES) header, usually with the start of a video or audio frame in a PES packet payload, where a PES packet is received through a multimedia transport stream as a plurality of transport stream packets.

The reference time used by the decoder that qualifies the PTS time is referred to as the system time clock (STC). The STC is a counter, or clock reference, maintained by the receiving (decoder) system. By comparing the values of the PTS time stamps to the system time clock and rendering the data associated with the PTS time stamps when a match occurs, a decoder may obtain synchronized presentation of audio and visual data. Note that the STC includes a nine-bit extension portion, which acts as a prescaler for clocking a 33-bit base portion. The PTS has only a 33-bit portion. A decoder may compare the PTS time stamp is to the STC's 33-bit base portion.

A decoder compares the separate PTS time stamps related to the audio and video data to attempts audio and video synchronization. The separate PTS time stamps are sent to each respective video or audio decoder. A video PTS tells the video decoder when to play video and an audio PTS tells the audio decoder when to play audio. While each of the presentation time stamps indicate when to play respective data, irregularities between video decoding and audio decoding may cause the audio data to be played out of sync with the video data. For example, the amount of time to decode video data may take much longer than the time to decode related audio data. The delay added when switching channels may also present decoding delays into the decoders. When audio data becomes out of sync with video data, various artifacts may be noticed by a viewer. Played audio may not be 'lip-synced' with played video data. The audio data may also be broken, as new audio data is played to interrupt expired audio data. Given the discussion above, it is apparent that a system and method for maintaining synchronization of audio data that overcomes at least some of these problems would be advantageous.

BRIEF DESCRIPTION OF THE DRAWINGS

Specific embodiments of the present invention are shown and described in the drawings presented herein. Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE FIGURES

At least one embodiment of the present invention provides for a method of presenting synchronized multimedia data. The method includes determining a synchronization state of an audio data relative to a system clock. In one embodiment, presentation time stamps associated with the audio data are compared to a value of the system clock to determine if synchronization has been maintained. Various states are defined for maintaining and establishing synchronization. The method includes maintaining current playback when the synchronization is in a first state. Audio data is played in the first state while the synchronization is maintained within a single audio sample. The method includes making a first playback adjustment when the synchronization state is in a second state. In one embodiment, audio samples are sample rate converted to remain within 2 to 3 samples of the system time clock. The method further provides for making a second playback when the synchronization state is in a third state. The second state indicates a better level of synchronization than the third state. The second playback adjustment provides a coarser playback adjustment than the first playback adjustment. In one embodiment, data packets are either repeated or dropped to remain within 2 to 32 audio packets of the system time clock. By providing various degrees of adjustments to synchronize audio data to the presentation time, a more accurate synchronization of output audio data to output video data may be provide, in comparison to conventional systems.

Figure 1:
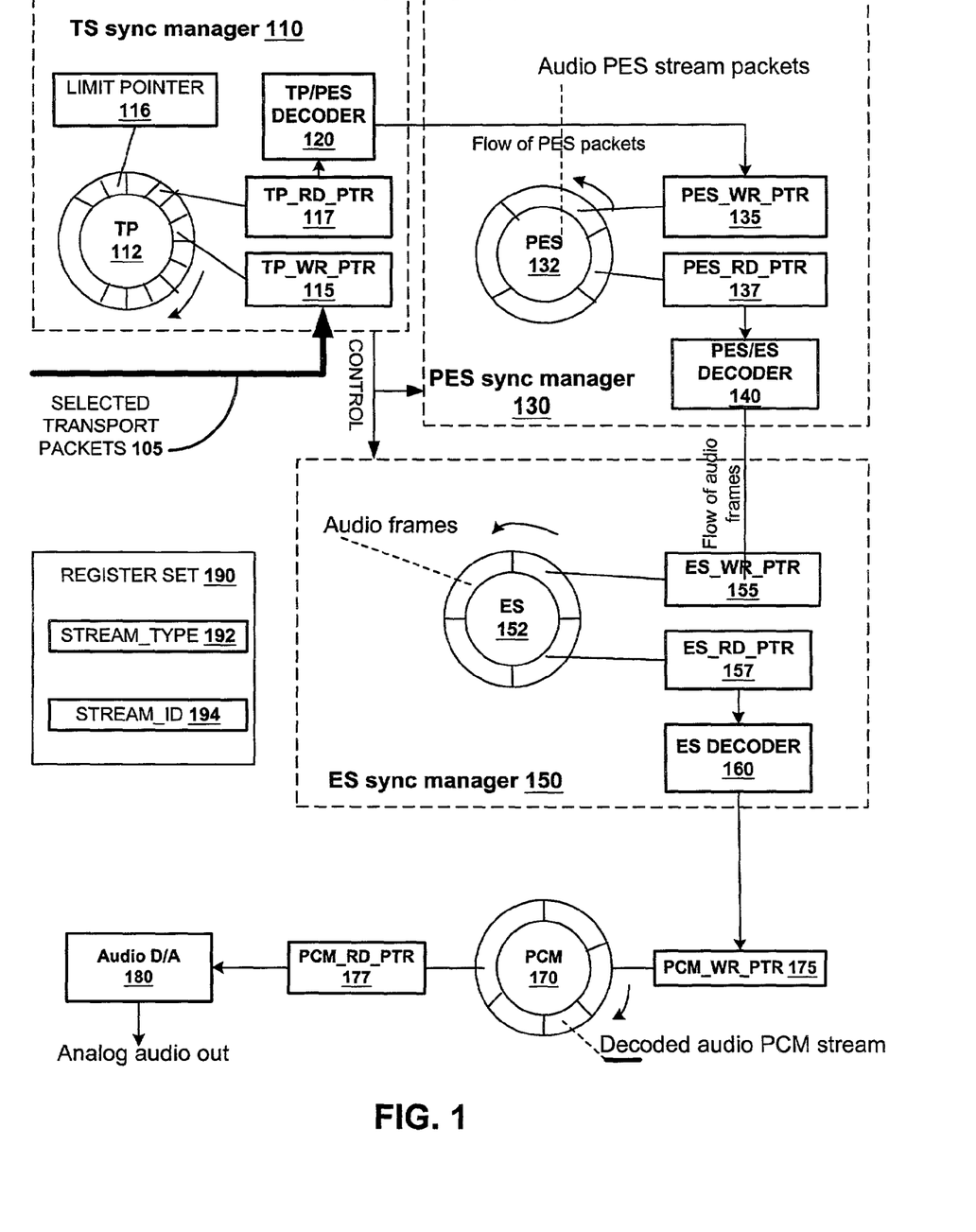
FIG. 1 is a block diagram illustrating a system for processing transport stream data into an audio signal synchronized to presentation time stamps, according to one embodiment of the present invention.

Referring now to FIG. 1, a block diagram illustrating a system for processing transport stream data into an audio signal synchronized to related video data is shown, according to one embodiment of the present invention. A demultiplexer (not shown) is used to select a single transport packet channel, made up of selected transport packets 105, within a packetized multimedia data stream. In one embodiment, the packetized multimedia data stream is a transport stream (TS) as defined by a motion pictures experts group (MPEG) specification. Audio data selected from the data stream are stored in a series of ring buffers 112, 132 and 152. The data is converted through a series of decoders 120, 140 and 160, into usable digital audio data. The audio is output as an analog signal after being processed through a digital to analog converter 180.

Synchronization of the audio data is maintained through a series of sync managers 110, 130 and 150. The sync managers 110, 130 and 150 process the data at different levels to perform coarse to fine adjustments to the data, reducing the amount of audio artifacts which may result due to irregularities in the multimedia decoding process. A first processing component, such as audio digital-to-analog converter 180 may be used to process data samples for playback. A second processing component, such as ES decoder 160 may be used to process data packets into data samples and maintain synchronization according to ES sync manager 150. A third processing component, such as PES/ES decoder may be used to process transport packets into data packets and maintain synchronization according to PES sync manager 130. A fourth data processing component, such as TP/PES decoder 120 may be used to process data stream data into data packets and maintain synchronization according to TS sync manager 110.

A demultiplexer is used to process a specific data stream into transport packets. In one embodiment, a TS sync manager 110, integrated into the demultiplexer, is used to manage the processing and delivery of transport packets and associated packetized elementary stream (PES) packets to components under the supervision of a PES sync manager 130. TS sync manager 110 is also capable of enforcing controls within the components under the control of PES sync manager 130 and elementary stream (ES) sync manager 150. For example, TS sync manager 110 may disable processing in sync managers 120 and 130 to provide itself exclusive control over synchronization.

A TP_WR_PTR register 115 is used to store a representation of selected transport packets received through the transport packet channel in memory. In one embodiment, the memory is organized in a circular buffer configuration, such as TP ring buffer 112. A value stored in TP_WR_PTR register 115 points to the memory location of TP ring buffer 112 in which new transport packets are stored. TP_RD_PTR register 117 is used to read transport packets from TP ring buffer 112. A value stored in TP_RD_PTR register 117 points to the memory location of TP ring buffer 112 holding the next transport packet to be processed. The read transport packet is then processed through a TP/PES decoder 120. TP/PES decoder 120 processes the read transport packets into PES packets. Once the TP packets are processed, resulting PES packets are delivered to the PES processing components, such as PES ring buffer 132 and PES/ES decoder 140, under the supervision of PES sync manager 130. Note that PES packets can be formed within a buffer internal to TP/PES decoder 120 before being stored in PES ring buffer 132. Alternatively, the PES packets may be formed within ring buffer 132.

As will be discussed further in respect to FIG. 5, TS sync manager 110 has control over the components used to process transport packets into PES packets. TS sync manager 110 also has control over the pointer registers 115 and 117, allowing TS sync manager 110 to skip or repeat received transport packets. For example, TS sync manager 110 may set TP_WR_PTR register 115 and TP_RD_PTR register 117 to the same value, effectively purging all data in TP ring buffer 112. In one embodiment, a limit pointer register 116 is used to identify a location in the TP ring buffer 112 that allows an interrupt to be set if the amount of data in TP ring buffer 110 increases beyond that point, thereby indicating the possibility of an overflow. TS sync manager 110 also has control over memory storage in other sync managers 130 and 150. For example, TS sync manager 110 may issue a command to purge data in ring buffers 112, 132 and 152, to allow for re-synchronization after an error is detected.

In one embodiment of the present invention, the primary role of TS sync manager 110 includes determining the type of received audio data in the transport packet and setting up PES/ES converter 140 and ES decoder 160 appropriately. Examples of the type of received audio may include MPEG data, Dolby Digital Sound Format (AC-3) data, linear pulse-coded modulation (LPCM) data, advanced audio coding (AAC) data, or digital theatre system (DTS) data. In one embodiment, the determination of audio type is made through a stream_type field available through a packet identifier in the transport packet. As shown later in FIG. 3, the stream type field value can be associated with a specific audio type. The audio type may be communicated to PES/ES converter 140 and ES decoder 160 either directly, or through a register, such as stream_type register 192 or stream_ID register 194 of register set 190 to properly handle the audio data, as described further in reference to FIGS. 2 and 3.

Setting up PES sync manager 130 and ES sync manager 140 may include halting processing within their respective components, for example disabling decoders 140 and 160. Processing may be halted to allow TS sync manager 110 exclusive control of synchronization. In one embodiment, TS sync manager 110 performs synchronization by setting the value of the system time clock (STC) to a program clock reference (PCR) value obtained through the data stream. The STC represents a system clock local to the components under the control of TS sync manager 110. The value of the STC is maintained to provide a reference to the source system generating the data stream data.

PES sync manager 130 is used to control a set of components used to process PES packets into ES data. In one embodiment, PES ring buffer 132 is used to store the PES packets in a circular buffer memory configuration. A PES_WR_PTR register 135 may be used to point to the location in PES ring buffer 132 to write new data. A PES_RD_PTR register 137 can be used to point to the end of the PES data set stored in PES ring buffer 132, indicating the location in memory to read new data. The data is then processed through a PES/ES decoder 140. In one embodiment, the PES/ES decoder 140 processes the PES packets into elementary stream data. Processing the PES packets may include extracting and stitching together elementary stream audio data from a collection of related PES packets.

Figure 3:
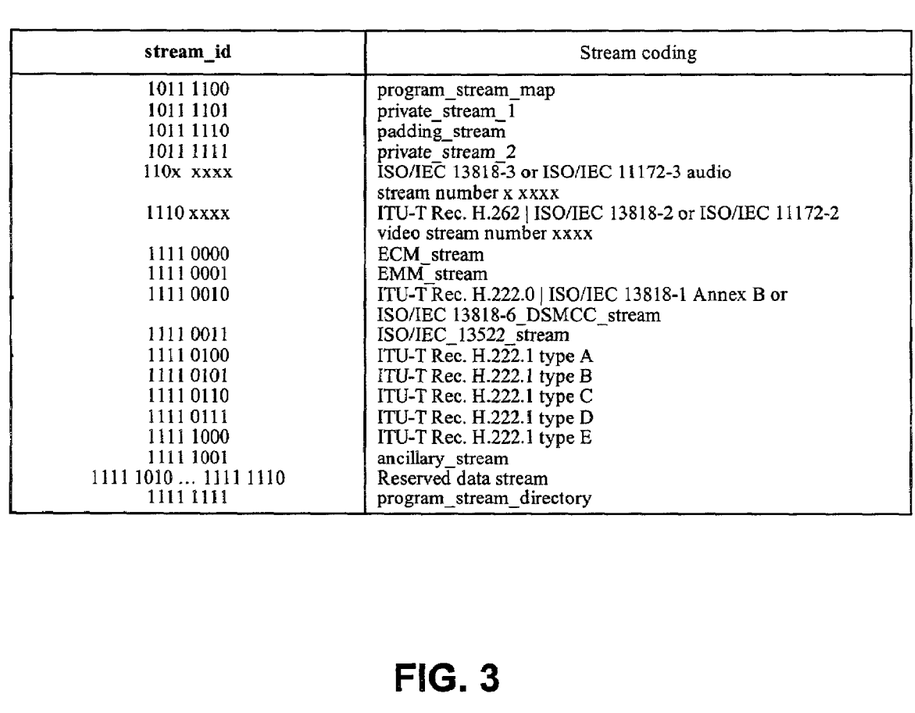
FIG. 3 is a table identifying several stream_id value assignments, according to one embodiment of the present invention.

In one embodiment, PES sync manager 130 has two main objectives. The first objective includes determining the audio type of the data being processed. If the audio type was unable to be determined using the TS sync manager 110, the PES sync manager 130 attempts to identify the audio type through comparison of a stream_id field within the PES packet and a list of stream_id assignments linked to various audio type standards, as shown in FIG. 3. If PES sync manager 130 is still unable to determine the audio type, PES sync manager 130 may attempt to search and locate synchronization words that may appear at the beginning of a valid audio frame. Analysis of the type of audio may be used to determine the length of the audio frames being processed. Analysis of the audio frame length may be used to determine the amount of space that must be reserved or the amount of processing which may be needed to decode the audio frame, allowing PES sync manager 130 to synchronize the presentation of decoded audio data.

A frame length refers to the amount of data needed to provide a full frame of audio. A 'Bit Rate' refers to the transmission bit rate of the PES packet. A 'Sampling Rate' is the audio sampling rate associated with the audio data in the PES packet. 'Padding' is determined from a P-bit field in the header of an audio frame within the PES packet. Determination of the audio frame layer type may be made through an audio layer field available through the audio frame header, wherein layers refer to a type of MPEG audio encoding. In one embodiment, the padding is set to: 0 if the P-bit field is set to 0; 1 if the P-bit field is set to 1 and the audio frame is Layer II or III; and 4 if the P-bit field is 1 and the audio frame is Layer I. In one embodiment, the frame length is calculated according to the following formulas:

Frame Length=(12*Bit Rate)/Sampling Rate+Padding, if Layer I audio frame; or

Frame Length=(144*Bit Rate)/Sampling Rate+Padding, if layer II/III audio frame.

Another objective of PES sync manager 130 includes maintaining frame-based audio synchronization. Synchronization may be accomplished through finding the start of audio frames and comparing extracted or interpolated PTS values to the system time clock STC value. The PES sync manager 130 may then decode to skip or repeat the current audio frame being processed. The frame may also be processed and played using a given sampling rate, determined through PES sync manager 130. These adjustments to audio frame processing may be performed until the PTS is synchronized to the STC. PES sync manager 130 may also halt processing by components under the supervision of ES sync manager 160, such as ES decoder 160. If synchronization is not maintained by PES sync manager 130, PES sync manager 130 may be halted and defer synchronization processing back to TS sync manager 110. Further details of the processing performed through sync manager 130 are described later in reference to FIG. 6.

PES/ES decoder 140 processes PES packets read from PES ring buffer 132. PES/ES decoder 140 processes the PES packets to extract ES data to be delivered to ES processing components under the control of ES sync manager 150. ES sync manager 150 handles control over processing performed through decoder 160 and storage into ES ring buffer 152. Data is written to ES ring buffer 152 using a write address location stored in ES_WR_PTR register 155. The data is read from ES ring buffer 152 at an address location specified through ES_RD_PTR register 157. The read data may be processed into pulse-coded modulation (PCM) data through ES decoder 160, or other data type as needed for playback by an audio decoder.

ES sync manager 150 is used to maintain audio synchronization. ES sync manger 150 may maintain synchronization by determining which audio samples being stored in ES ring buffer 152 are played. For example, if the audio samples are currently in sync, all the samples stored in ES ring buffer 152 may be passed through ES decoder 160, allowing the samples to be played. However, if the samples are not in sync, ES sync manager 152 may drop or repeat the samples until synchronization is obtained. For example, if the PTS is larger than the STC, indicating the presentation time has not been met, ES sync manager 150 may repeat some of the audio samples stored in ES ring buffer 152 by resetting ES_RD_PTR register 157 with the memory location of a previously read sample. If the PTS is smaller than the STC, indicating the time for delivery of the audio samples has passed, ES sync manager 150 may drop some of the samples stored in ES ring buffer 152 by appropriately setting ES_WR_PTR register 157 to reflect memory locations within ES ring buffer 152 passed the late samples, allowing them to be effectively skipped. Accordingly, samples stored in ES ring buffer 152 may be skipped or repeated in attempts to present the audio samples with PTS values closest resembling the STC value.

ES sync manager 150 may also perform a sample rate conversion, through ES decoder 160. By converting sequences of audio samples to a slower sampling rate, time may be provided to allow the PTS of new samples to match the STC. Through a sample rate conversion to a faster sampling rate, samples with a late PTS may be played while allowing future samples a chance to match their PTS to the STC. Further details on the control of processes through ES sync manager 160 are described further in reference to FIG. 7. In one embodiment, the sample rate conversion is performed on a sequence of 16, 32, 64, 128, or 256 samples. The number of samples to be converted may be limited by the capabilities and/or length of a finite impulse response (FIR) filter used to implement the sample rate conversion.

Decoded PCM samples are written to a PCM ring buffer 170, at an address location stored in PCM_WR_PTR register 175. The PCM samples are read from PCM ring buffer 170 at an address location specified through PCM_RD_PTR register 177. Read PCM samples may be converted to analog audio signals through audio digital to analog (D/A) converter 180. The converted analog audio signal may be output to a receiving device (not illustrated), such as an audio receiver or a speaker system. The processing of the synchronization managers 110, 130 and 150 may be provided through hardware, such as through circuitry, or through software stored on a computer readable medium designed to control the processing of hardware. It should be appreciated that other components or levels of synchronization management may be provided without departing from the spirit or scope of the present invention.

Figure 2:
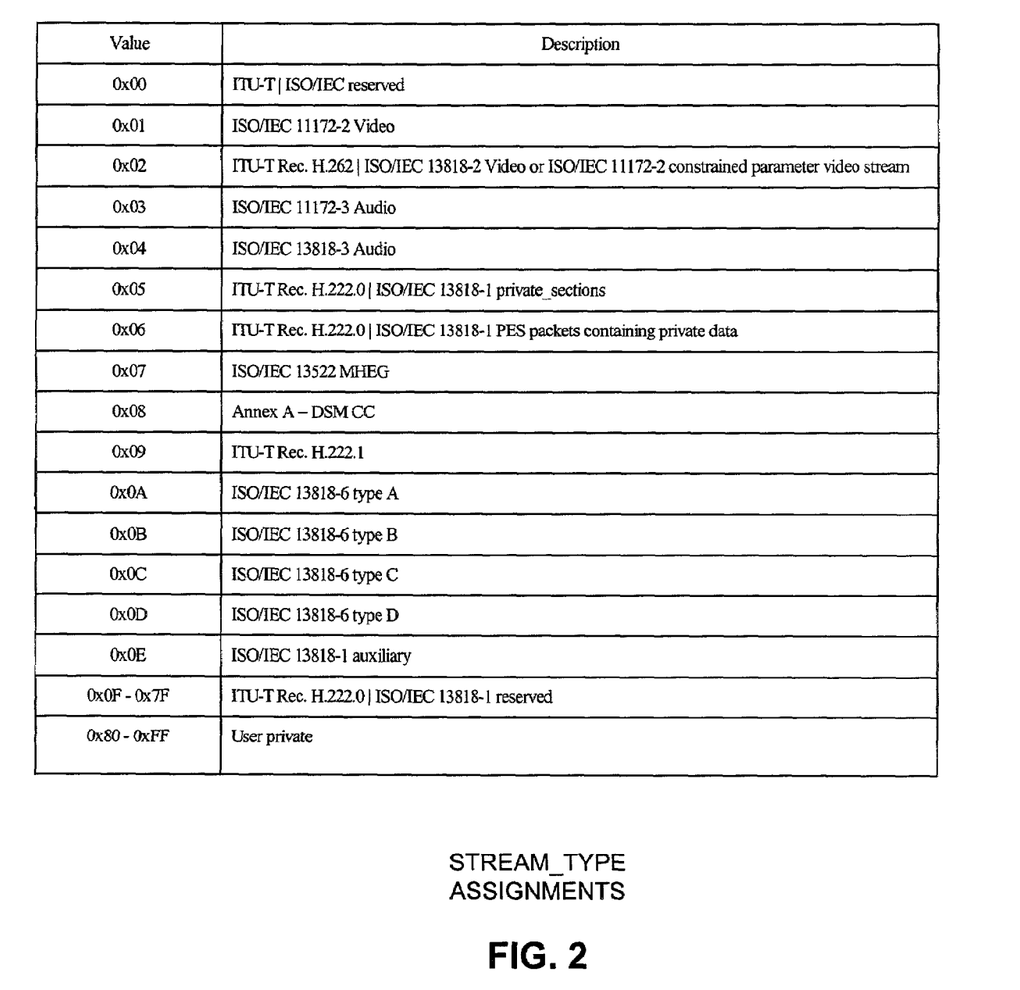
FIG. 2 is a table identifying a variety of stream_type value assignments, according to one embodiment of the present invention.

Referring now to FIG. 2, a table identifying various stream_id field assignments and corresponding stream type descriptions is shown, according to one embodiment of the present invention. A stream_id field located in a transport stream program identifier (PID) section may include information regarding the type of data being presented through a specific transport stream. The leftmost column of the table is used to identify specific stream_id field values. The right-hand column is used to identify the type of data represented. For example, if the stream type is 3 or 4, stream_type set to 0x03 or 0x04, the audio type may be identified as ISO/IEC 11172-3 audio data or ISO/IEC 13818-3 audio data, indicating audio types as specified to MPEG audio specifications. In one embodiment, all other types stream_type values indicate unknown audio types, leaving the audio type to be determined through PES sync manager 130 (FIG. 1), through identification of a stream_id field, as discussed further in reference to FIG. 3.

Referring now to FIG. 3, a table identifying stream_id values with the type of coding performed to generate data within the stream. PES sync manager 130 (FIG. 1) uses the reported coding type to determine the processing which may be needed to appropriately synchronize the data represented by the PES packets. In one embodiment, the type of processing includes delaying data so that decoded audio data may be played back at the same time as decoded video data. The leftmost column lists stream identifier values that may be found in a stream_id field within a PES packet. The right-hand column is used to describe the type of stream encoding performed on the data represented by the PES packet. The described stream coding may be used to determine the type of data. For example, in one embodiment, a stream_id value between 0xC0 and 0xDF, indicates MPEG stream encoding. Alternatively, if the stream_id is 0xBF, the encoding refers to AC-3.

Figure 4:
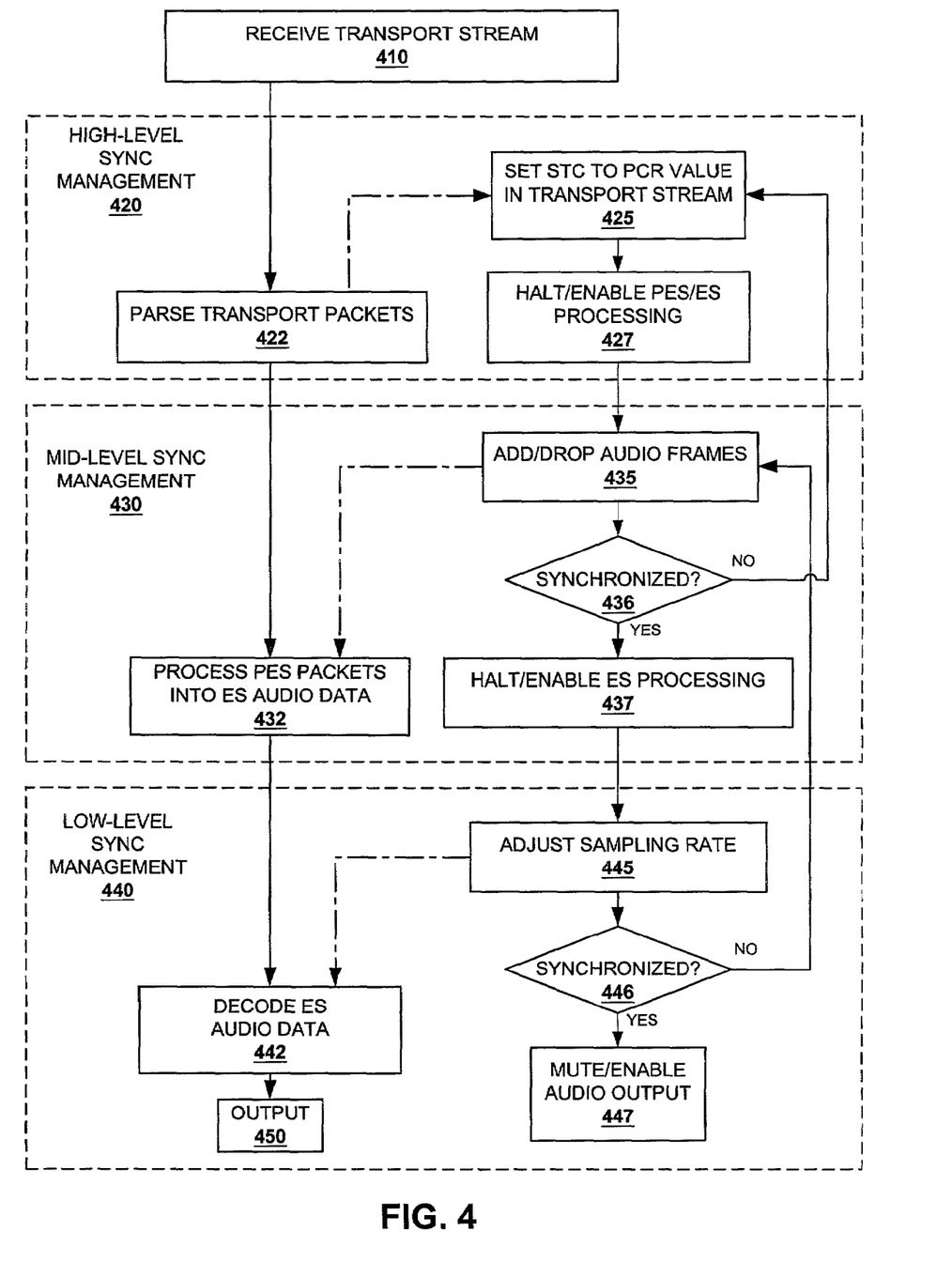
FIG. 4 is a flow diagram illustrating a method of maintaining synchronization between related audio and video data, according to one embodiment of the present invention.

Referring now to FIG. 4, a method of synchronizing received audio data is shown, according to one embodiment of the present invention. Several levels of synchronization are used to process the audio data. A first state, or level of synchronization (not shown) may be used to maintain current playback of audio data. A second state, or level, of audio synchronization may include fine sync management 440 for fine adjustment of processed audio data to maintain synchronization, allowing a return to the first level of synchronization. A third state, or level, of synchronization may include medium sync management 430 to provide coarser adjustment than fine sync management 440. A fourth state, or level, of synchronization may include coarse sync management 420 to provide coarse adjustment to the audio data, and to enforce processing states in lower levels of management 430 and 440.

In step 410, a packetized data stream is received through a demultiplexer. The packetized data stream may be provided by a multimedia source, such as a digital video broadcast. In one embodiment, the packetized data stream is a transport stream as defined according to MPEG specification. In step 422, transport packets are separated from the data stream in a demultiplexer. The processing of the data through the demultiplexer may be controlled using steps 425 and 427, associated with course sync management 420. The transport packets may pertain to a specific multimedia channel within the packetized data stream. Audio and video transport packets within the packetized data stream may be provided with presentation time stamp (PTS) information, pertaining to the time the data must be presented to an output. The PTS can inform a system when to play audio data so as to be synchronized with decoded video data.

In step 425, a system time clock (STC) is synchronized, or set, to a program clock reference (PCR) value received through the packetized data stream. The PCR indicates the current time in the source device. By synchronizing the STC to the PCR, the receiving system can use the PTS to indicate the proper time for data delivery. In step 427, dependent on the processing performed during coarse sync management 420, processes in the lower levels 430 and 440 are enabled or halted. For example, lower levels 430 and 440 may be halted to allow coarse sync management 420 to adjust the STC value to assert synchronization, as described further in reference to FIG. 5. Once the STC value has been altered, processing may resume in lower levels 430 and 440, allowing finer synchronization to be performed.

Steps 435–437, associated with medium sync management 430, built around PES processing components, are used to provide less coarse adjustments to the data output through coarse sync management 420, including processing PES packets returned from the demultiplexer into ES packets in step 432. In step 435, audio frames from the PES packets are dropped or repeated to adjust for the difference between the PTS values and the STC value. Audio frames may be repeated to provide more time before presenting the audio data, allowing for the extra amount of time needed for video decoding. Audio frames may be dropped if the audio data is late and newer frames must be presented.

In step 436, it is determined whether or not the audio data is synchronized after the adjustments performed through step 435. In one embodiment, synchronization is dependent on the difference in the values of the PTS and the STC. If synchronization has not been met, medium management 430 defers processing to coarse sync management 420. If synchronization was successfully maintained, the data may be passed to fine sync management 440. Medium sync management 430 may also halt or enable processing to be performed by fine sync management 440, dependent on whether synchronization has been maintained. If synchronization has not been maintained, processes within fine sync management 440 are halted. If synchronization has been achieved, processes within fine sync management 440 may be enabled.

In step 442, ES data output from processing in step 432 is processed into presentable audio data. Fine sync management 440 may be used to maintain synchronization of the data to be output. In step 445, adjustments to the sampling rate of the audio data is made to maintain synchronization. In step 446, if synchronization has not been maintained, fine sync management 440 must defer synchronization processing to medium or course sync management. In step 450, if synchronization is achieved, the decoded audio data may be output. Fine sync management 440 can have additional control to mute or enable the output of the decoded audio data. For example, if synchronization has not been achieved, the output may be muted to avoid presenting audio artifacts to the output. It will be appreciated that additional levels of synchronization may be performed without departing from the scope of the present invention.

Figure 5:
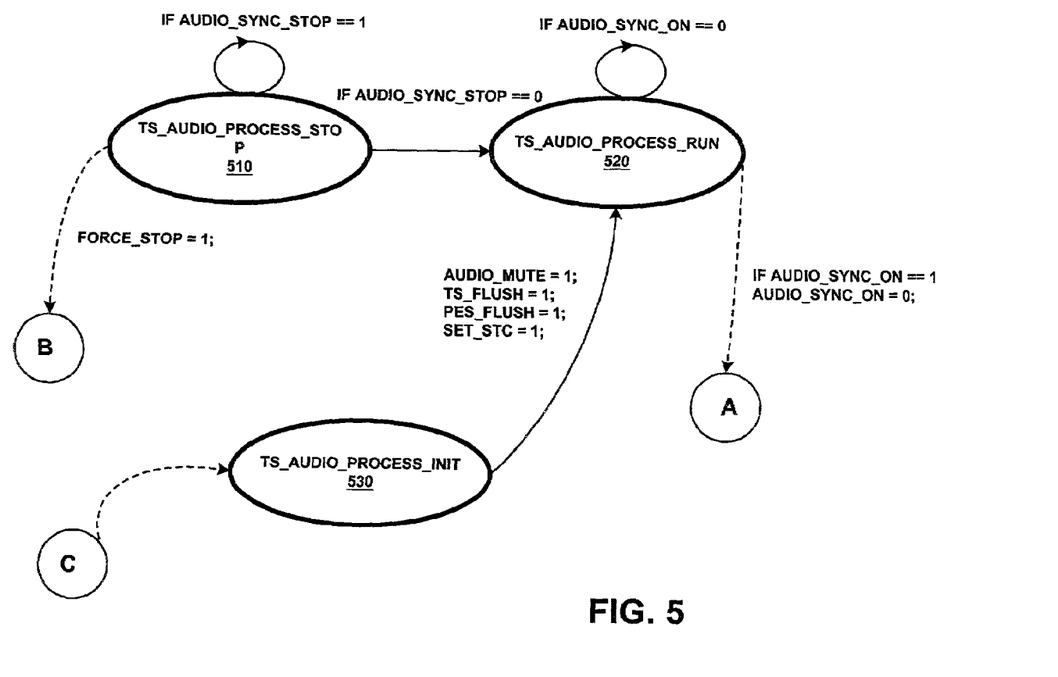
FIG. 5 is a state diagram illustrating a method for handling the synchronization of data in transport packet processing components, according to one embodiment of the present invention.

Referring now to FIG. 5, a state diagram is shown illustrating states pertaining to processing within a TS synchronization manager, such as course sync manager 420 (FIG. 4), according to one embodiment of the present invention. As previously discussed, audio packets within a transport stream contain presentation time stamps (PTS) indicating the time at which the audio packets must be presented to an output. The time stamp information is compared to a system time clock (STC). The difference between the PTS and a comparable value in the STC is referred herein as delta. In one embodiment, the TS synchronization manager, such as TS sync manager 110 (FIG. 1), is built around a transport stream demultiplexer. The TP synchronization manager is used to provide coarse adjustments to synchronize audio data within a transport packet by reducing the value of delta. The TP synchronization manager may also defer synchronization to be performed by other synchronization managers, such as a PES synchronization manager and an ES synchronization manager.

Figure 6:
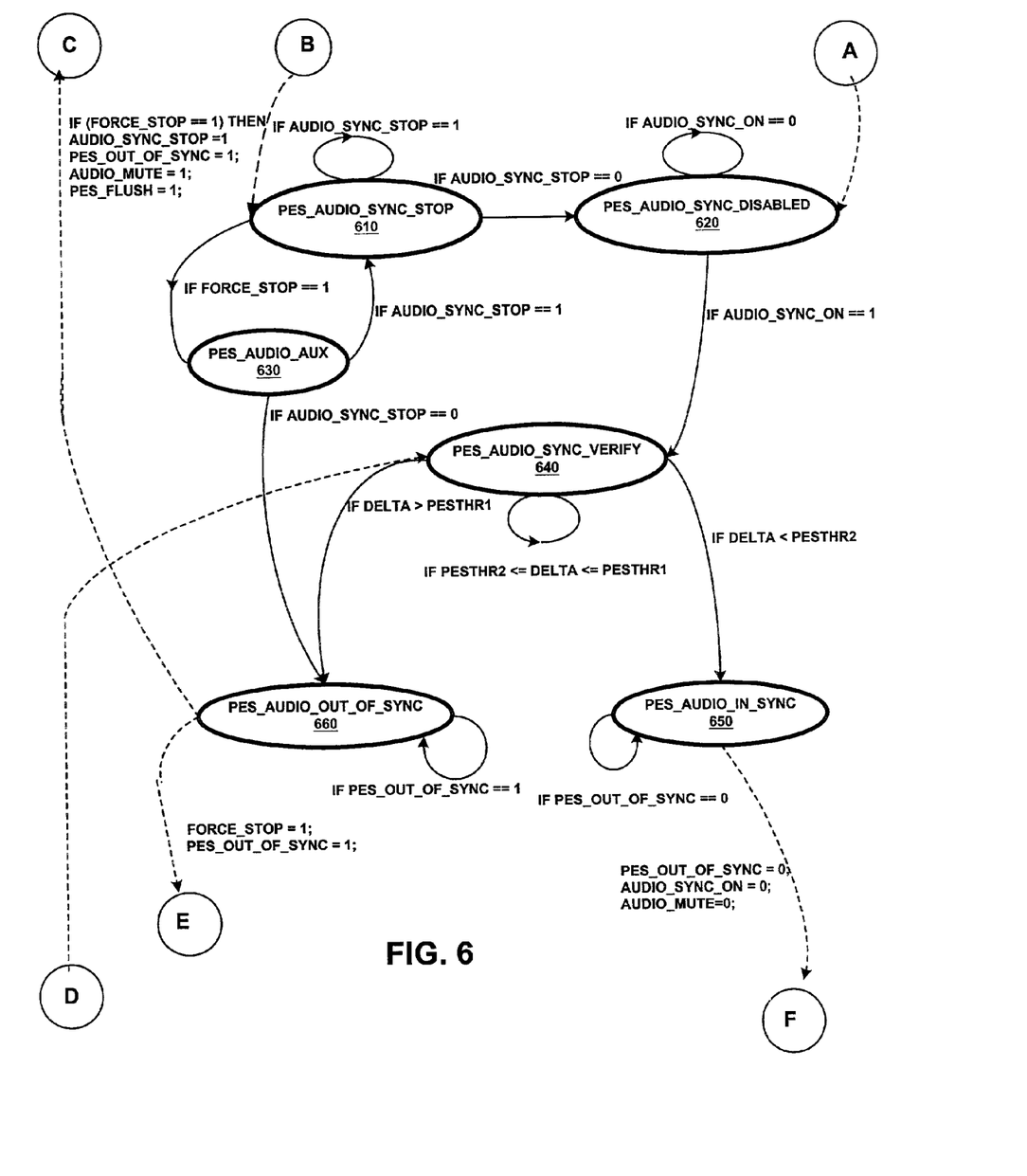
FIG. 6 is a state diagram illustrating a method for handling the synchronization of data in packetized elementary stream processing components, according to one embodiment of the present invention.

In state 510, all processing of audio data from the transport stream is stopped. The PTS and STC values are not used to affect any multimedia playback. The output signals are muted and audio decoding is stopped. Data buffers pertaining to the audio decoding are cleared. In one embodiment, the data buffer for TS processing, such as TS ring buffer 112 (FIG. 1) is cleared by setting the value of the buffer read pointer and the value of the buffer write pointer to the start of the buffer. Accordingly, by setting respective read and write pointers to the start of the buffers, the data in the PES ring buffer 132 (FIG. 1) and ES ring buffer 152 (FIG. 1) can also be cleared. In one embodiment, a FORCE_STOP register value is set to '1'. The setting of FORCE_STOP to '1' is used to indicate to the PES synchronization manager to stop processing data. The PES synchronization manager and the ES synchronization manager may also be forced to disabled states, such as state 620 (FIG. 6). In one embodiment, the TS synchronization manager remains in state 510 until an external program, such as a multimedia application program, releases processing to be done by setting an AUDIO_SYNC_STOP value to a '0'. It will be appreciated that values other than '1' or '0' may be used to assert processing in different states, and '1' and '0' are used herein only to refer to enabled or disabled states.

In state 520, processing of the audio data through the TS synchronization manager is allowed. Transport stream parsing is enabled. Transport stream parsing is used to select specific channels and transport data packets from the transport stream for processing through a demultiplexer. The transport data packets are processed into PES packets. The PES packets are then sent to a PES audio bit-stream buffer, such as PES ring buffer 132 (FIG. 1). In one embodiment, audio synchronization may be enabled or disabled through the use of an AUDIO_SYNC_ON register. If AUDIO_SYNC_ON is set to '1', audio synchronization is enabled, if it is set to '0' audio synchronization is disabled. Accordingly, if audio synchronization is disabled, the TS synchronization manager leaves the PES and ES synchronization managers in disabled states, as set through state 510. However, if audio synchronization is enabled, the TS audio synchronization manager forces the PES and ES synchronization managers out of their disabled states.

Instate 530, the processes within the transport stream are initialized. Initialization may occur when hardware is reset, after the demultiplexer is programmed to switch to a different transport stream channel, or after a big delta value is found. For example, in one embodiment, the PES synchronization manager, such as PES sync manager 130 (FIG. 1), is used to correct synchronization by skipping audio frames. If the PES synchronization manager is unable to correct synchronization, it must defer to coarse adjustments to be made by the TS synchronization manager. Accordingly, processing within the PES synchronization manager in state 660 (FIG. 6) is deferred to state 530. In state 530, the TS synchronization may reset the value of the STC to the next value of a received program clock reference (PCR) or PTS. PCR values are sent through the transport stream and represent the value of the clock within the transmitting multimedia source at the time the PCR is read by the demultiplexer. As all other attempts to reduce delta may have failed, resetting the STC insures that delta is reduced by effectively setting the STC value to the PTS or PCR value.

Referring now to FIG. 6, a flow chart illustrating states pertaining to processing within a PES synchronization manager is shown, according to one embodiment of the present invention. The PES synchronization manager is used to maintain control of components used to process PES packets into ES packets. The PES synchronization manager is used to synchronize audio PES packets by performing less coarse adjustments, in comparison to the TS synchronization manager, to the packets to reduce the difference between the PTS values and the STC value (delta).

In state 610, the PES synchronization manager is in a stopped operation state. PTS and STC values do not affect multimedia playback. The audio output is muted and audio decoding is stopped. The PES, ES, and PCM ring buffers, such as ring buffers 132, 152 and 170, respectively, are cleared by setting corresponding read and write pointers to point to the start of the ring buffers. Once AUDIO_SYNC_STOP is set to '0', the PES synchronization manager transitions to state 620. In one embodiment, state 630 is used as a transitional state to mute the audio output signal and clear the ring buffer associated with the PES synchronization manager, such as PES ring buffer 132 (FIG. 1). State 630 is used as a transitional state for processing before proceeding to state 610, or state 660, associated with a loss of synchronization.

In state 620, the PES synchronization manager is disabled. The PES synchronization manager may be disabled due to a change to a different channel within the transport stream, discontinuities in the transport stream, or errors within the transport stream or PES packet streams. While synchronization is disabled, the audio continues to be decoded and played without interference or synchronization attempts by the PES synchronization manager. Accordingly, occasional underflow or overflow of the PES and ES ring buffers may occur, creating audio artifacts. The audio may be muted to conceal the audio artifacts, until a PES audio packet is found. The PES synchronization manager may remain in state 720 until audio synchronization is enabled. In one embodiment, an AUDIO_SYNC_ON register is set to a value of '1' to indicate that audio synchronization is enabled. Once audio synchronization is enabled, the PES synchronization manager may transition to state 740.

In state 640, the status of the synchronization in the PES synchronization manager is determined. In one embodiment, two thresholds are used to determine synchronization. A first threshold, PESTHR1 is set to the number of cycles needed to play three decoded frames of audio.

An additional threshold, PESTHR2, is used to determine how long synchronization is maintained. In one embodiment, PESTHR2 is defined as the amount of clock cycles required playing a single decoded audio frame. A condition, "audio frame achieved", is used to indicate when the value of delta is greater than or equal to PESTHR2, but less than or equal to PESTHR1.

As long as the "audio frame achieved" condition is maintained, the PES synchronization manager remains in state 640. If the value of delta becomes greater than PESTHR1, the PES synchronization manager transitions to state 660 in which the synchronization manager is considered out of sync. If delta falls below PESTHR2, the PES synchronization manager transitions to state 650, in which the synchronization manager may be considered in sync. It should be appreciated that the threshold values used may be changed, and the values described herein are used only to provide a reference of proximity to synchronization. Other values of thresholds may be chosen without departing from the scope of the present invention.

When the PES synchronization manager has lost synchronization, the PES synchronization manager is forced into state 660. Loss of synchronization may occur due to a change in selected transport stream channel or a large delta value. In one embodiment, the audio output is muted in order to conceal loss of synchronization. The ES synchronization manager is placed in a stop state, such as state 710 (FIG. 7), allowing the PES synchronization manager to handle synchronization. The value if delta is monitored to determine how long to remain in state 660. In one embodiment PESTHR1 is used to compare against the value of delta. The value of PESTHR1 may be set to the amount of clock cycles needed for 3 complete audio frames. In one embodiment, an "audio frame exceeded" condition occurs when the value of delta is greater than the value of PESTHR1.

In the "audio frame exceeded" condition, the PES synchronization manager may perform a set of specialized actions. In one embodiment, the actions include assembling audio frames from a PES packet in a separate compressed audio bit stream buffer. This may be used to cover cases in which a fraction of an audio frame, or multiple frames and a fraction of a frame exist. In such cases, only a single PTS value may have been provided. The separate compressed audio bit stream buffer can be used to separate frames, providing interpolated PTS values to individual frames, based off the single PTS value, or reconstructing full audio frames from fractions of audio frames. In one embodiment, the single PTS value is applied to the first audio frame from the received multiple frames and the following audio frames are given interpolated PTS values.

While the PES synchronization manager remains out of sync, a PES_OUT_OF SYNC register may be set to '1' to indicate to the ES synchronization register of the condition of the PES synchronization manager. Furthermore, FORCE_STOP may be set to '1' to place the ES synchronization manager in a stopped state, allowing the PES synchronization manager to exclusively handle synchronization. While in state 660, the PES synchronization manager may also drop or repeat audio frames from the ES ring buffer until a "frame approached" condition is reached, wherein the value of delta is less than or equal to PESTHR1. Once in the "frame approached" condition, the PES synchronization manager may return to state 640.

In state 650, the PES synchronization manager is considered synchronized, wherein the difference between the STC value and the PTS is within the threshold of the synchronization manager. Further synchronization may be performed using the ES synchronization manger, which may be used to determine the sampling rate in which to output the audio. In one embodiment, the PES synchronization manager sets a register PES_OUT_OF_SYNC to '0' to indicate the PES synchronization manager is in sync. Other register settings may include an AUDIO_SYNC_ON register set to '1' to indicate audio data synchronization is enabled and an AUDIO_MUTE set to '0' to indicate that audio should not be muted. It should be noted that other registers and value may be used without departing from the present invention.

It will be appreciated that the PES synchronization manager applies less coarse adjustments to maintain synchronization than the TS synchronization manger. While the PES synchronization manager makes adjustments to drop or repeat received audio frames, the TS synchronization manager performs more coarse adjustments, such as resetting the value of the STC. Furthermore, while the coarser TS synchronization manager may assert states in the PES synchronization manager, the PES synchronization manager may only defer synchronization to be performed by the TS synchronization manager and only has control of its own states and states in the ES synchronization manager. The ES synchronization manager in turn applies finer adjustments to maintain synchronization, such as sampling rate conversion, as will be discussed further in reference to FIG. 7.

Figure 7:
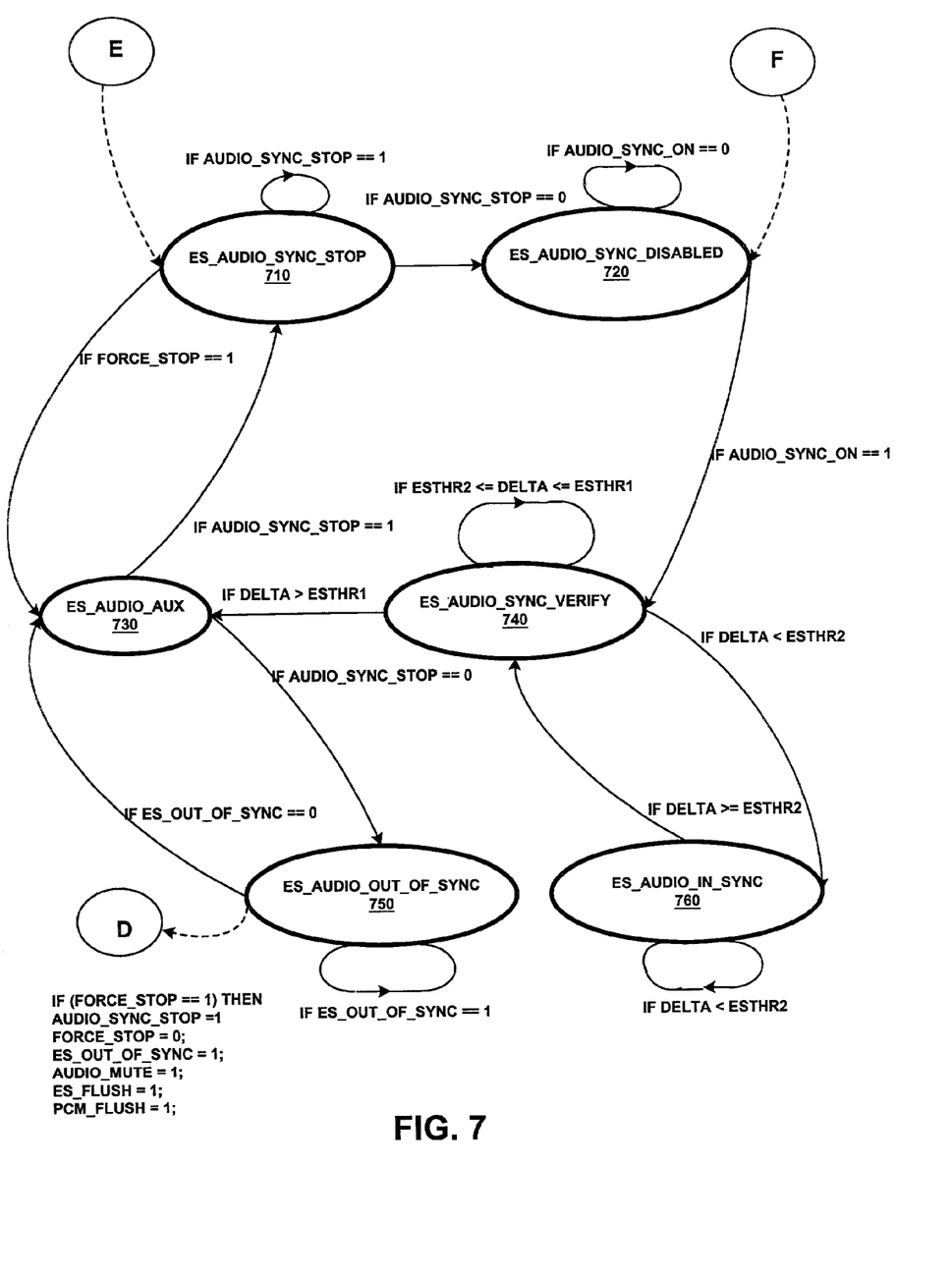
FIG. 7 is a state diagram illustrating a method for handling the synchronization of data in elementary stream processing components, according to one embodiment of the present invention.

Referring now to FIG. 7, a flow chart illustrating states pertaining to processing within an ES synchronization manager is shown, according to one embodiment of the present invention. The ES synchronization manager is used to provide synchronization of audio data to associated PTS values. The ES synchronization manager handles synchronization through control of various audio-processing components.

In state 710, the ES synchronization manager is placed in a stopped state. The PTS and STC values are not used to affect multimedia playback. The audio output signal is muted and no audio decoding is performed. Memory associated with the ES data and the PCM output data, such as ES ring buffer 152 (FIG. 1) and PCM ring buffer 170 (FIG. 1) are cleared. In one embodiment, the ring buffers 152 and 170 are cleared by setting corresponding read and write pointers to the start of the ring buffer memory. The ES synchronization manager is taken out of state 710 when an AUDIO_SYNC_STOP register value is changed to '0', allowing the ES synchronization manager to transition to state 720. In one embodiment, a transitional state, state 730, is provided to initialize synchronization in the ES synchronization manager. State 730 may be used for clearing the ES and PCM ring buffers and muting audio, before ES synchronization manager transitions to state 710.

In state 720, the ES synchronization manager is disabled. Audio is decoded and played at the sampling rate determined through data provided in the transport stream. While, the PTS and STC values, and delta, may be updated and monitored, the values do not affect changes in processing. ES synchronization manager remains in state 720 until audio synchronization is enabled, at which point the synchronization manager may transition to state 740. In one embodiment, audio synchronization is enabled through values written to an AUDIO_SYNC register in which a value of '1' is used to enable audio synchronization.

In state 740, the ES synchronization manager determines the status of synchronization within the ES synchronization manager. The ES synchronization manager attempts to synchronize received audio data to within a set number of audio samples. In one embodiment, an upper and a lower threshold are used to verify and maintain synchronization. An inner threshold, ESTHR2 is used to track when delta falls below the value of ESTHR2, which may be a value such as 2 audio samples. An outer threshold, ESTHR1, may be used to determine when the value of delta grows beyond the limit of synchronization. In one embodiment, ESTHR1 is set to a fixed value, such as 32 audio samples. State 740 may be used to monitor three conditions. A first condition, referred to as the "audio frame pull-in" condition, refers to when the value of delta is greater than ESTHR2 but less than or equal to ESTHR1. While reference has been made to specific threshold values, other values may also be used. For example, ESTHR1, the outer threshold may be set to other values, such as 4, 8, or 16 audio samples. Furthermore, the threshold values may be designed to be variable, allowing the values to be adjusted dependent on the amount of synchronization desired.

In one embodiment, during the "audio frame pull-in" condition, the audio is played and an audio decoder is instructed to drop or repeat groups of audio samples until synchronization is maintained, in which the value of delta falls below ESTHR2. In one embodiment, the ES synchronization manager performs a sample rate conversion on the audio data to play the audio at an alternate rate and affect the value of delta. While the "audio frame pull-in" condition is met, the ES synchronization manager remains in state 740, continuing to attempt corrections to synchronize. If the value of delta grows greater than the value of ESTHR1, due to data stream errors or clock jitter, a new condition, "audio frame pull-out", is reached.

In the "audio frame pull-out" condition, the ES synchronization manager is considered out of sync and ES synchronization manager may transition to state 750. In one embodiment, ES synchronization manager transitions to state 730 to mute audio and clear the memory buffers, before transitioning to state 750. In state 750, the ES synchronization manager does not attempt to correct the synchronization problem but defers synchronization to the PES synchronization manager, such as to state 640 (FIG. 6), until the value of delta is brought back down. As performed through state 730, audio is muted and the memory buffers are cleared.

While in state 740, if the value of delta successfully fall below ESTHR2, a third condition, "audio frame sync" is reached. The decoder may then begin to play the audio samples and transition to state 760. In state 760, the ES synchronization manager is considered to have maintained lock and is in sync. The audio may be played at the sampling rate provided through the transport stream data. In one embodiment, ES synchronization manager is considered in sync when delta is within one audio sample. However, to achieve absolute synchronization, the audio data may continue to be sample rate converted within state 760 to force delta down to zero. If the value of delta grows greater than or equal to ESTHR2, the synchronization is lost and the ES synchronization manager transitions back to state 740; otherwise, the synchronization manager remains within state 760.

Accordingly, a hierarchy may be constructed in which the TS synchronization manager maintains the highest level, providing the coarsest adjustments, and having control over the other synchronization managers. The PES synchronization manager could represent the next lower level in which it provides midlevel adjustments and only has control over the ES synchronization manager. In turn the ES synchronization manager is allowed to perform the finest adjustments, such as sample rate conversion, to achieve synchronization. Loss of synchronization in the ES synchronization manager forces it to defer control back to the next higher level, the PES synchronization manager.

Figure 8:
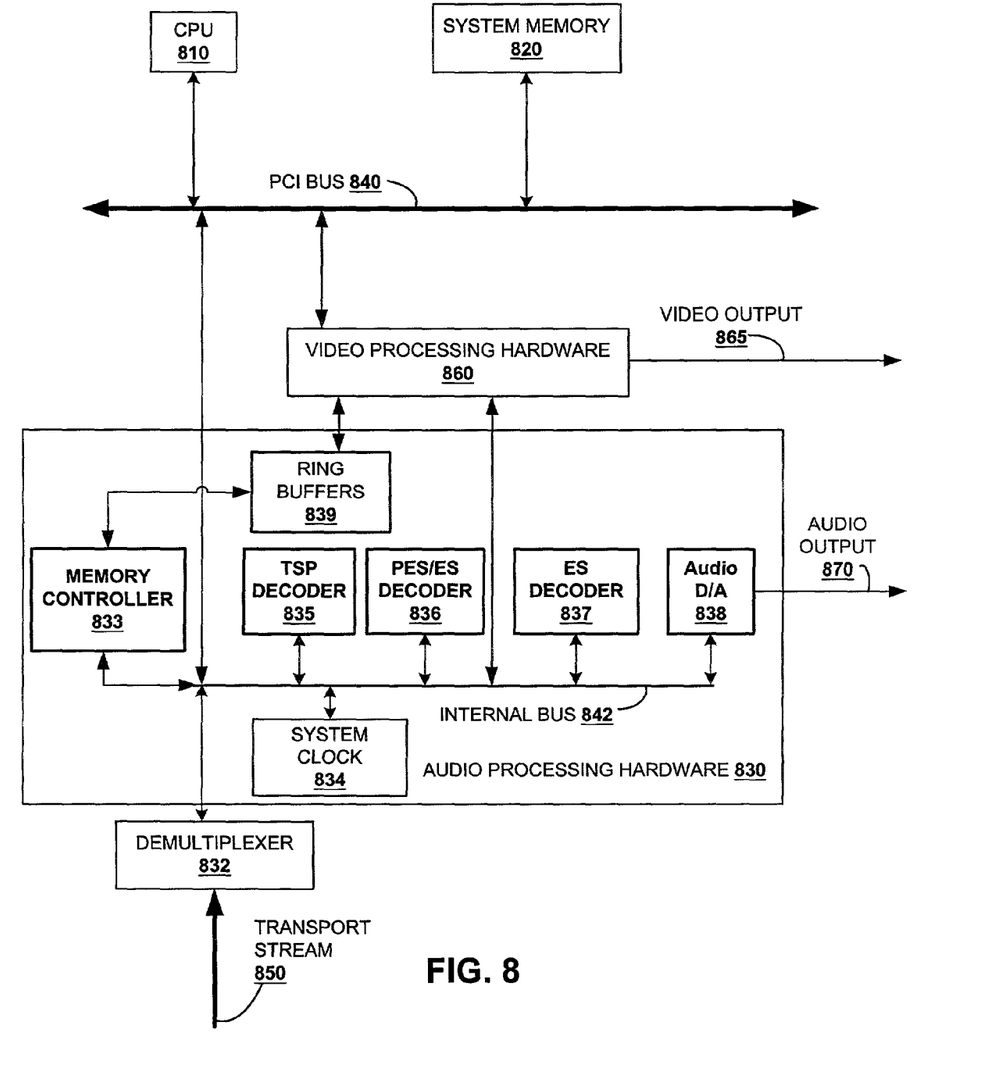
FIG. 8 is a block diagram illustrating a system for handling audio and video data, according to one embodiment of the present invention.

Referring now to FIG. 8, a block diagram of a system for handling video and audio data is shown, according to one embodiment of the present invention. Multimedia data is parsed from a transport stream 850. Audio and video data is processed through processing components 830 and 860, respectively. The audio and video data are presented as audio output signal 870 and video output signal 865 at times specified by a presentation time stamps provided through transport stream 850. In one embodiment, the processing components 830 and 860 are part of an information handling system with central processing unit 810. Data from processing components 830 and 860 are stored within a series of ring buffers 839, through memory controller 833. Ring buffers 839 may be a part of hardware, such as audio processing hardware 830 or video processing hardware 860. Ring buffers 839 may also be stored within system memory 820, through communications over an I/O bus, such as PCI bus 840.

Transport packets are generated from a transport stream 850 through a demultiplexer 832. In one embodiment, audio data from the transport packets is processed through audio processing hardware 830 and video data is processed by video processing hardware 860. The audio data from the transport stream includes transport packets. The transport packets may be processed into PES packets through a transport stream packet decoder 835. The PES packets may be processed into ES packets through a PES/ES decoder 836. The ES packets may be decoded into PCM data through an ES decoder 837. The digital PCM audio data is processed into analog audio signals through a PCM analog-to-digital converter 838. The analog audio signals are output as audio output signal 870. The audio output signal 870 may be sent to audio speakers (not shown) to provide the audio data from transport stream 850.

Video data form the selected transport stream 850 is processed through video processing hardware 860. In one embodiment, control, such as through TS sync manager 110 (FIG. 1), built around demultiplexer 832 is used to synchronize a system clock 834 to a program clock reference provided through transport stream 850. Control, such as PES sync manager 130 (FIG. 1), is built around PES/ES decoder to synchronize PES packets to a presentation time stamp. Control, such as ES sync manager 150 (FIG. 1), is used to synchronize the PCM data to the PTS. Synchronization is used to provide audio data in audio output signal 870 synchronized to video data in video output signal 865. Video processing hardware 860 may have access to data from demultiplexer 832 or audio processing hardware 830 through connection to PCI bus 840 or through a direct connection to a bus internal to audio processing hardware, such as internal bus 842. Communication with audio processing hardware 830 may be used to provide information on a presentation time associated with video data pending or about to be presented.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that while components of the system have been describes in reference to multimedia processing components, the present invention may be practiced using other types of system components. It should be appreciated that the system described herein has the advantage of obtaining and maintaining synchronization. While a specific method of processing platform independent commands has been described herein, it should be appreciated that other methods may be employed without departing from the scope of the present invention.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   determining a synchronization state of an audio data relative to a system clock;
   when the synchronization state is in a first state maintaining a current playback when the synchronization state is in a second state making a first playback adjustment to the audio data, wherein the first playback adjustment includes performing a sample rate conversion by interpolation of one or more audio data samples of the audio data; and when the synchronization state is in a third state making a second playback adjustment to the audio data, the second playback adjustment to provide a coarser playback adjustment than the first playback adjustment.

2. The method as in claim 1, further comprising:
when the synchronization state is in a fourth state initializing the system clock to a predefined value.

3. The method as in claim 2, wherein the predefined value is equal to a representation of a system clock associated with a source of data.

4. The method as in claim 3, wherein the representation of the system clock associated with the source of the audio data is a program counter clock associated with MPEG-type data.

5. The method as in claim 1, wherein the second playback adjustment includes adjustments to PES packets.

6. The method as in claim 5, wherein the second playback adjustment includes repeating PES packets.

7. The method as in claim 5, wherein the second playback adjustment includes dropping PES packets.

8. The method as in claim 1, wherein determining a synchronization state includes comparing a PTS value to an STC value.

9. The method as in claim 8, wherein a difference between the PTS value and the STC value is compared to a delta value.

10. The method as in claim 9, wherein a delta value associated with the first state indicates a time difference equivalent to playback of a single audio data sample.

11. The method as in claim 10, wherein the time to play a single audio sample is calculated by determining an audio data type.

12. The method as in claim 11, wherein determining the audio data type is based upon a data stream type.

13. The method as in claim 11, wherein determining the audio data type is based upon a data stream identifier.

14. The method as in claim 9, wherein a delta value associated with the second state indicates a range of time from the time required for playback of 2 audio samples to the time required for playback of 32 audio data samples.

15. The method as in claim 14, wherein the time to play an audio sample is calculated by determining an audio data type.

16. The method as in claim 15, wherein determining the audio data type is based upon a data stream type.

17. The method as in claim 15, wherein determining the audio data type is based upon a data stream identifier.

18. The method as in claim 9, wherein a delta value associated with the third state indicates a range of time from the time required for playback of 1 audio frame to the time required for playback of 3 audio data frames.

19. The method as in claim 18, wherein the time required for playing audio frames is calculated by determining an audio data type.

20. The method as in claim 19, wherein determining the audio data type is based upon a data stream type.

21. The method as in claim 19, wherein determining the audio data type is based upon a data stream identifier.

22. The method as in claim 9, wherein the delta value is variable.

23. The method of claim 1, wherein the first playback adjustment further comprises filtering of the one or more audio data samples.

24. A system comprising:
a data processor having an I/O buffer;
a first data processing component maintain playback of audio data samples according to a first state of synchronization;
a second data processing component to perform a first playback adjustment to maintain a second state of synchronization, wherein the first playback adjustment includes performing a sample rate conversion by interpolation of one or more of the audio data samples;
a third data processing component to perform a second playback adjustment to maintain a third state of synchronization, the second playback adjustment to provide a coarser playback adjustment than the first playback adjustment; and
a system time clock to track presentation times associated with the audio data.

25. The system as in claim 24, further including:
a fourth data processing component to initialize the system time clock to a predefined value to maintain a fourth state of synchronization.

26. The system as in claim 25, wherein the predefined value is equal to a representation of a system clock associated with a source of data.

27. The system as in claim 26, wherein the representation of the system clock associated with the source of the audio data is a program counter clock associated with MPEG-type data.

28. The system as in claim 24, wherein the second playback adjustment includes adjustments to PES packets.

29. The system as in claim 28, wherein the second playback adjustment includes repeating PES packets.

30. The system as in claim 28, wherein the second playback adjustment includes dropping PES packets.

31. The system as in claim 24, wherein operations within the data processing components are determined by comparing a PTS value to an STC value.

32. The system as in claim 31, wherein a difference between the PTS value and the STC value is compared to a delta value.

33. The system as in 32, wherein a delta value associated with the first state indicates a time difference equivalent to playback of a single audio data sample.

34. The system as in claim 33, wherein the time to play a single audio sample is calculated based on a determination of an audio data type.

35. The system as in claim 32, wherein a delta value associated with the second state indicates a range of time from the time required for playback of 2 audio samples to the time required for playback of 32 audio data samples.

36. The system as in claim 32, wherein a delta value associated with the third state indicates a range of time from the time required for playback of 1 audio frame to the time required for playback of 3 audio frames.

37. The system as in claim 32, wherein the delta value is variable.

38. The system as in claim 24, further comprising memory operably coupled to the data processor to store code for the first, second and third data processing components.

39. The system as in claim 24, wherein the first, second and third data processing components are represented in hardware.

40. The system as in claim 24, wherein the first data processing component includes a demultiplexer.

41. The system as in claim 24, wherein the presentation time is determined through a presentation time stamp associated with a data stream.

42. The system as in claim 24, wherein the presentation time of the data packets are interpolated from the presentation time stamp associated with the data stream.

43. The method as in claim 24, wherein the second data processing component further processes data packets into data samples.

44. The system of claim 24, wherein the first playback adjustment further comprises filtering of the one or more audio data samples.

45. A computer readable medium tangibly embodying a plurality of programs of instructions, the plurality of programs including:
a first data processing component to maintain playback of audio data samples according to a first state of synchronization,
a second data processing component to perform a first playback adjustment to maintain a second state of synchronization, wherein the first playback adjustment includes performing a sample rate conversion by interpolation of one or more of the audio data samples;
a third data processing component to perform a second playback adjustment to maintain a third state of synchronization, the second playback adjustment to provide a coarser playback adjustment than the first playback adjustment.

46. The computer readable medium as in claim 45, further including a fourth data processing component to initialize the system time clock to a predefined value to maintain a fourth state of synchronization.

47. The computer readable medium as in claim 45, wherein the third data processing component controls hardware used to process the data packets into data samples.

48. The computer readable medium as in claim 45, wherein the second data processing component controls hardware for processing the data samples.

49. The computer readable medium as in claim 45, wherein operations within the data processing components are determined by comparing a PTS value to an STC value.

50. The computer readable medium of claim 45, wherein the first playback adjustment further comprises filtering of the one or more audio data samples.

51. A method comprising:
receiving an MPEG-type transport stream;
demultiplexing the MPEG-type transport stream to generate transport packets;
synchronizing a system time clock to a program clock reference received through the MPEG-type transport stream;
determining if a PTS value associated with the transport packets is within a predefined value of the system time clock;
when the PTS value is within the predefined value, performing a sample rate conversion by interpolation of audio samples related to the transport packets; and
when the PTS value is not within the predefined value, adjusting PES packets related to the transport packets.

52. The method as in claim 51, wherein the transport packets are processed into the PES packets.

53. The method as in claim 52, wherein the PES packets are processed into the audio samples.

54. The method as in claim 51, wherein the predetermined value indicates a range of time from the time required for playback of 1 audio frame to the time required for playback of 3 audio data frames.

55. The method as in claim 54, wherein the time required for playing audio frames is calculated by determining an audio data type.

56. The method of claim 51, wherein the first playback adjustment further comprises filtering of the audio data samples.

* * * * *

UNITED STATES PATENT AND TRADEMARK OFFICE
CERTIFICATE OF CORRECTION

| | | |
|---|---|---|
| PATENT NO. | : 7,130,316 B2 | |
| APPLICATION NO. | : 09/833493 | |
| DATED | : October 31, 2006 | |
| INVENTOR(S) | : Branko D. Kovacevic | |

It is certified that error appears in the above-identified patent and that said Letters Patent is hereby corrected as shown below:

Column 16, Line 3 change "component maintain" to --component to maintain--

Signed and Sealed this

Ninth Day of January, 2007

JON W. DUDAS
*Director of the United States Patent and Trademark Office*